April 25, 1933. W. AITKENHEAD 1,905,671
FLEXIBLE HARROW OR CULTIVATOR
Filed Nov. 25, 1931 2 Sheets-Sheet 1
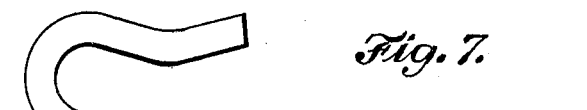
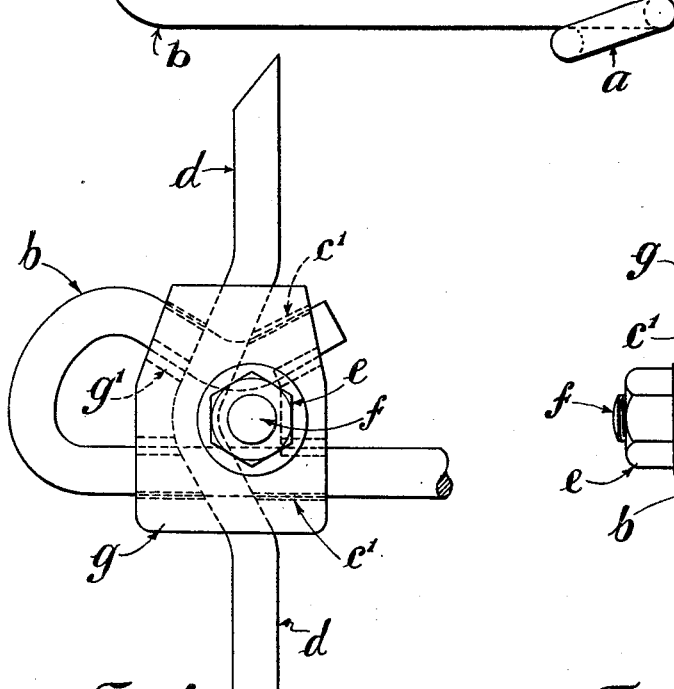
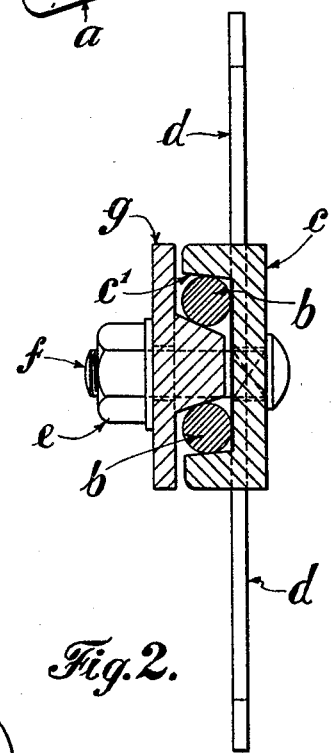
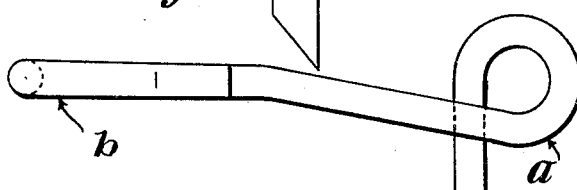
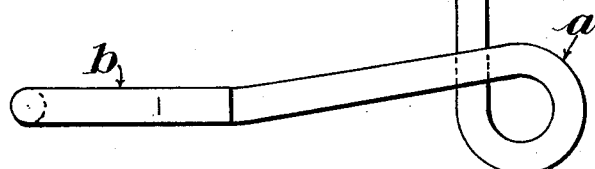

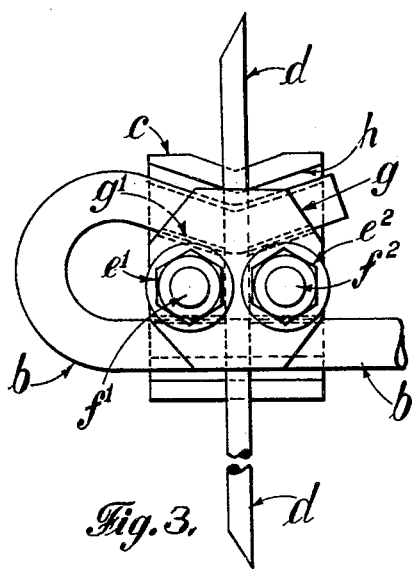
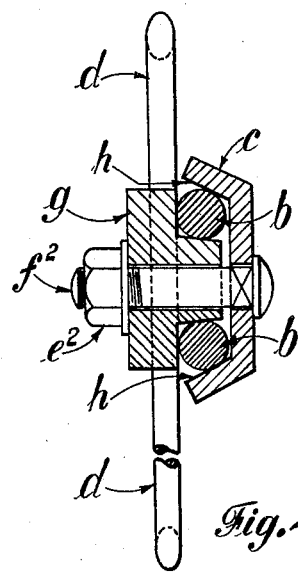
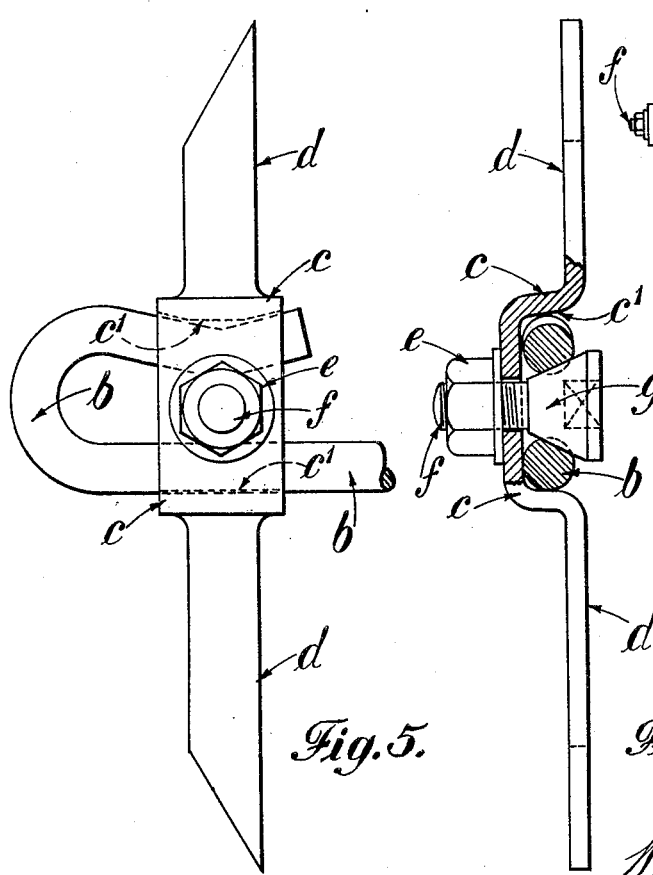
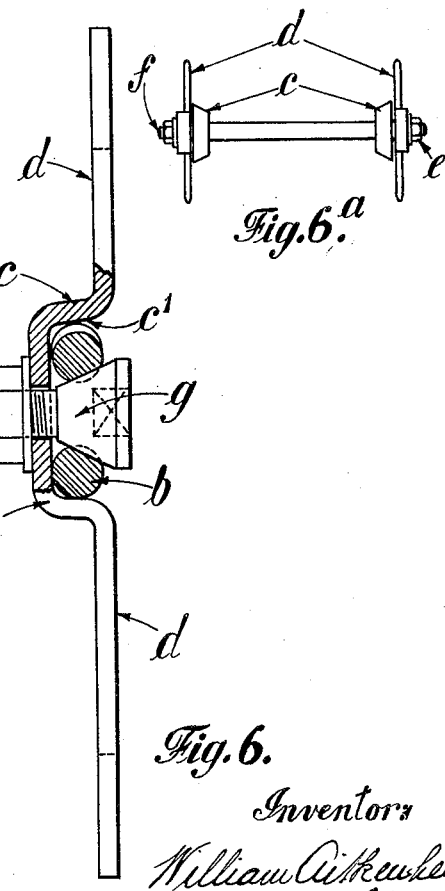

Patented Apr. 25, 1933

1,905,671

UNITED STATES PATENT OFFICE

WILLIAM AITKENHEAD, OF FAILSWORTH, ENGLAND

FLEXIBLE HARROW OR CULTIVATOR

Application filed November 25, 1931, Serial No. 577,278, and in Great Britain December 8, 1930.

This invention relates to flexible harrows or cultivators of the type comprising a plurality of links, hooked one to another, and each carrying a tine or tines. The links are generally made with two eyes or loops and two arms, and each arm is formed with a hook at its free end. The hooks engage with the eyes or loops of an adjacent link. The hooks may both be made with the bent-over portion elongated for the purpose of carrying a tine, or only one of the hooks may be so made, and the other used only for the purpose of attachment to the adjacent link.

The object of this invention is to provide improved means for securing the tines rigidly to the links and allowing them to be quickly replaced, without unhooking the links.

According to the invention, a two-part tine holder is employed adapted to engage the opposite sides of the link hook and the parts of the holder having on their opposed sides inclined faces, which are inclined to the plane of the hook, and those on one part being preferably inclined at a greater angle than those of the other part. Further, one of the holder parts is recessed to receive a tine, or the tine is made integral with a holder part. The two parts of the holder and the tine are tightened on to the hook by a nut and bolt or the like, the inclined faces of the holder parts engaging the hook.

Certain of the inclined faces on the holder parts may be V shaped longitudinally and the overhanging part of the hook may be similarly shaped, so that the holder and tine when clamped to the hook will be prevented moving in any direction relatively to the hook.

The tine may be bent to partly encircle the bolt, and be angularly adjustable about the bolt, the tine having a pin to engage one or other of a series of holes in a gapped portion of one of the holder parts.

In some cases, two clamping bolts are used in which event the tine may be adjustable vertically relatively to the holder.

The tines may be made to any suitable cross section, length or outward configuration, and they may be single or double ended.

In the drawings:—

Figs. 1 and 2 represent an elevation and cross section respectively of one example of the invention, the tines being double-ended and non-inclinable.

Figs. 3 and 4 represent similar views of a further example of the invention, the tine being double-ended and adjustable vertically.

Figs. 5 and 6 represent further and like views to Figs. 1 and 2 of yet another example of the invention, the tine being double-ended and integral with one part of the clamp.

Fig. 6ª is a side view of a modification hereinafter described.

Figs. 7 and 8 are an elevation and plan respectively of one type of flexible harrow link.

The links are conveniently made by bending a rod of hard steel to the form shown in Figs. 7 and 8. In such example, the rod has two loops $a$, and two hooks $b$. In some cases, a tine is applied to each hook, in others a tine is applied only to one of the hooks, the other hook being simply used for engaging the eye of another link. In all cases both hooks engage the eyes of adjacent links.

As shown in Figs. 1 and 2, the overhanging part of each hook is formed V shape in the plane of the hook. The tine holder part $c$ of the clamp is formed with a V shaped recess. In the tine holder $c$ is a further and V shaped or like recess, into which fits the tine $d$, the recess corresponding with the longitudinal shape of the tine at that part, and thereby preventing the endwise withdrawal of the tine. A nut $e$ on bolt $f$ when tightened up, presses a tine holder clamping part $g$ and the tine $d$ against the arms of the hook $b$, and causes the inclined faces $g^1$ of the clamping part $g$ to force apart the arms of the hook and grip them against the inclined faces of the part $c$, while the longitudinal formation of the inclined faces definitely prevents any endwise movement of the tine holder and tine along the hook. The inclination of the transversely inclined faces of the tine holder $c$ to the plane of the hook is preferably greater than that of the inclined faces of the clamping part $g$.

By unscrewing the nut $e$, the tine $d$, bolt $f$, and clamping part $g$ can be removed from the link hook without disengaging the link from its neighbours, and by removing the nuts, clamps and tines from the two hooks of the link, and disengaging the eyes of the link from the hooks of the neighbouring links, the link can be removed from the harrow.

The clamping part $g$ has inclined projections to right and left of the bolt $f$, the bolt passing between them, but there may be a single projection, and the bolt pass through the projection.

In Figs. 3 and 4, the tine $d$ is free to move vertically in the tine holder clamping part $g$, so that its working length may be varied, and in this connection, two bolts $f^1$, $f^2$ and nuts $e^1$, $e^2$ are provided. The overhanging part of the hook $b$ is forced towards the other part of the hook by the longitudinally converging inclined faces $h$, $h$, in the part $c$, and gripped between such faces and the like inclined faces of the clamping part $g$.

In Figs. 5 and 6, the tine $d$ is made integral with the holder part $c$, and is recessed or bent to engage with the hook $b$, the inner faces of the shoulders $c^1$ being slightly inclined transversely and longitudinally to engage the inclined faces of the overhanging part of the hook $b$. The bolt $f$ is made integral with the clamping part $g$, which is in the form of a truncated cone, and the inclined face of which preferably enters depressions formed in the inner faces of the hook $b$. The combined tine and tine holder is pressed against the hook $b$, which in turn is pressed against the inclined face of the cone $g$, under the tightening of the nut $e$.

An advantage of the invention is that as the parts of the hooks are forced apart, or brought together by the tightening action of the clamp and the shape of said parts, any departure in manufacture from the true form of the hook is automatically corrected, and any slackness which may take place in time between the tine and the said parts of the hook, by reason of rust or other causes, can easily be taken up by tightening the clamp adjusting means.

The bolt $f$ (Figs. 1, 5 and 6) or bolts $f^1$, $f^2$ (Figs. 3 and 4) may extend to the other hook of the link, and serve for the clamp and tine of such other hook, see Fig. 6$^a$.

In all cases the clamping means for holding the tine to the loops of the harrow has a clamp providing two acutely inclined relatively movable faces and a third and opposed abutment face of the tine itself in the angle of the said inclined faces between which three faces the link is clamped by a bolt and nut.

It will be obvious that the invention may be applied to a reversible or non-reversible type of flexible harrow, and that the tines may be applied to one or both hooks of each link.

What I claim is:—

1. In flexible harrows or cultivators composed of a plurality of links having hooks and eyes or loops for connection with one another, and clamping means for holding tines thereto, a clamp having two acutely inclined relatively movable faces, and a third and opposed abutment face of the tine itself in the angle of the said inclined faces between which three faces the link is clamped.

2. In flexible harrows or cultivators composed of a plurality of links having hooks and eyes or loops for connection with one another, two-part clamps for holding tines thereto, one part of each clamp having a recess with opposite, inclined faces and the other part having complementary projections with inclined faces, the inclinations of the complemental inclined faces being at an acute angle to each other and being inclined to the plane of the link hook, and the inclination of the inclined faces of one part being greater than the inclination of the inclined faces of the other part, and the said recessed holder part having a further recess for the tine, lying substantially at right angles to the main recess, a bolt passing through both parts of the holder, and a nut screwing on to the bolt for forcing the two parts of the holder together and causing their inclined faces to engage the link hook, and clamp the tine thereto, substantially as herein set forth.

3. A two-part tine holder as claimed in claim 2, wherein the upper inclined face of the recess in one part is of V-shape longitudinally, and wherein the upper faces of the projections on the other part are of like shape, in combination with a link hook, the overhanging part of which is also of V shape longitudinally, whereby on tightening the nut the holder and tine are held against movement in all directions relatively to the hook, substantially as herein set forth.

4. In flexible harrows or cultivators and in tine-securing means therefor, a two-part tineholder applied to each hook, the parts of which have inclined faces adapted to engage a link hook, and tightening means common to the holders of the two hooks of a link, substantially as herein set forth.

In testimony whereof I have signed my name to this specification.

WILLIAM AITKENHEAD.